United States Patent [19]
Day et al.

[11] Patent Number: 4,855,265
[45] Date of Patent: Aug. 8, 1989

[54] HIGH TEMPERATURE LOW THERMAL EXPANSION CERAMIC

[75] Inventors: John P. Day, Big Flats; Robert J. Locker, Corning, both of N.Y.

[73] Assignee: Corning Incorporated, Corning, N.Y.

[21] Appl. No.: 177,050

[22] Filed: Apr. 4, 1988

[51] Int. Cl.[4] .................. C04B 35/10; C04B 35/18; C04B 35/46; C04B 35/50

[52] U.S. Cl. .................. 501/128; 501/80; 501/134; 501/152

[58] Field of Search .................. 501/128, 134, 80, 152

[56] References Cited

U.S. PATENT DOCUMENTS

| | | | |
|---|---|---|---|
| 2,776,896 | 1/1957 | Harman et al. | 501/134 |
| 4,327,188 | 4/1982 | Endo et al. | 501/134 |
| 4,483,944 | 11/1984 | Day et al. | 501/128 |
| 4,767,731 | 8/1988 | Asami et al. | 501/136 |

OTHER PUBLICATIONS

Refractory Materials for Use in High-Temperature Areas of Aircraft, ADC Technical Report 53-9, Norman R. Thielke, Jan. 1953, p. 28.

*Primary Examiner*—Mark L. Bell
*Attorney, Agent, or Firm*—Charles Q. Buckwalter, Jr.

[57] ABSTRACT

This invention relates to the high temperature stabilization of aluminum titanate and aluminum titanate-mullite compositions by the addition of iron oxide. It has been found that iron oxide concentrations greater than 5 weight percent and as high as approximately 25 weight percent have a stabilization effect at high temperatures on aluminum titanates. The resultant ceramic body is further enhanced by the addition of from 0.1 to 5 weight percent rare earth oxide.

12 Claims, 2 Drawing Sheets

HIGH TEMPERATURE LOW THERMAL EXPANSION CERAMIC

BACKGROUND OF THE INVENTION

This invention relates to the high temperature stabilization of aluminum titanate and aluminum titanate-mullite compositions by the addition of iron oxide. It has been discovered that iron oxide concentrations greater than 5% and as high as approximately 25% by weight have a stabilization effect at high temperatures on aluminum titanate. This effect is uncommon to prior stabilization attempts.

Aluminum titanates may be effectively used as filters for fluids, in particular, as diesel particulate filters and as substrates for catalytic converters, an example of which is known commonly in the art as a honeycomb substrate. Additionally, aluminum titanates are desirable in applications where the thermal shock resistance and the ultimate use temperature are high. Cellular substrates used under conditions of high thermal gradients are examples of this application. Typically, structures such as the above are subjected to harsh environments which require high thermal shock resistance, low thermal expansion, and high mechanical properties. Skilled workers in the art appreciate that maintaining these properties for extended periods of time in their intended environments eliminates many potentially useful refractory materials. The reordering of crystalline phases, which commonly occurs in ceramic materials subjected to these environments, impairs the desired physical and chemical properties. The result is a degraded structure which is no longer appropriate for its intended use.

It is known in the art that the inclusion of rare earth oxides and iron oxides to compositions consisting essentially of aluminum titanate, provides the body with sintering aids and further increases stabilization to high temperature degradation. It has not been conclusively determined how the stabilization is effected, although it is known that $Fe_2TiO_5$ is in solid solution with $Al_2TiO_5$. The solid solution is effected during firing, and is facilitated at high temperatures, above about 1400° C. The role the rare earth oxide plays is to affect the grain growth behavior, thus adding mechanical strength.

It has been found with the present invention that the addition of surprisingly large amounts of $Fe_2O_3$ may be incorporated in the $Al_2TiO_5$ matrix. This combination may then be subsequently extruded and sintered to form a honeycomb structure. The resultant structure produces a thermally durable product with improved physical properties, unknown to the prior art.

In U.S. Pat. No. 4,483,944 (the U.S. Pat. No. 4,483,944), an aluminum titanate-mullite ceramic composition is disclosed which includes 0.5 to 5% iron oxide and 0.5 to 5% rare earth oxides. In the U.S. Pat. No. 4,483,944 it was disclosed that 0.5 to 5% iron oxide and 0.5 to 5% rare earth metal oxides will most desirably be present to serve as a sintering aid and to inhibit the decomposition of $Al_2O_3$. $TiO_2$ crystals when exposed to high temperatures.

U.S. Pat. No. 4,327,188 (the U.S. Pat. No. 4,327,188) discloses the use of aluminum titanate with the rare earth and iron oxide additives. The U.S. Pat. No. 4,327,188 discloses that there is a disadvantage to adding more than 2 weight percent of the specific additive due to an increase in the thermal expansion and a decrease in the melting point.

That there is a trade-off between the thermal properties and long life of aluminum titanate bodies has been known to the art. A remaining difficulty in the art is to insure stabilization of the additive-laden aluminum titanate body. A goal has been to find a body that can withstand temperatures in excess of 1400° C. and maintain the crystalline integrity at lower temperatures. The body should be able to withstand, without significant decomposition, extended use at temperatures between approximately 1000° C. and 1300° C. This property is important since it is well known to those skilled in the art that $Al_2O_3$. $TiO_2$ will decompose into corundum and rutile when exposed to temperatures within the above cited temperature range. To guard against this decomposition, it is necessary to thermally stabilize the aluminum titanate phase.

Therefore, the primary objective of the present invention was to develop an aluminum titanate-containing body which exhibits high mechanical strength, a low linear coefficient of thermal expansion, is capable of extended use at temperatures in the vicinity of 1400° C., while maintaining crystalline integrity after very prolonged exposure to temperatures within the range of 1000-1300° C. Additionally, the body is capable of repeated cyclings in the temperature range between room temperature and well over 1000° C. without significant change in dimensional integrity.

SUMMARY OF THE INVENTION

We have found that the above objective and others that will be illustrated below can be attained in ceramic bodies consisting essentially of five basic components; viz., $Al_2O_3$, $TiO_2$, $SiO_2$, rare earth oxide (expressed as $RE_2O_3$), and iron oxide (expressed as $Fe_2O_3$). Fundamentally, the bodies consist essentially of two crystal phases; viz., aluminum titanate ($Al_2TiO_5$) and mullite ($3Al_2O_3.2SiO_2$). Because of the ready reaction of $Fe_2O_3$ with $TiO_2$, however, at least a portion of the aluminum titanate phase present in the inventive products may actually consist of a solid solution containing $Fe_2TiO_5$. Such solid solution is readily apparent from a study of x-ray diffraction patterns produced by the crystals. Hence, the typical overall pattern of aluminum titanate is present, but the d-spacings and intensities are slightly altered. Accordingly, the expression aluminum titanate solid solution will be used in the description to generally identify the aluminum titanate containing crystals.

The consolidation of alumina, titania, and iron oxide provide a body with excellent thermal decomposition properties. However, the environment of eventual use demands a ceramic body with good thermal shock resistant properties and high mechanical strength. Therefore, to make the ceramic body useful for its intended environment, strengthening components must be added. Additives must be chosen so that strength is added to the body without interfering with the desirable thermal properties. The present invention contemplates the use of rare earth oxides and mullite to solve this problem.

As expressed in terms of weight percent on the oxide basis, the inventive compositions consist essentially of about 1.5-20% $SiO_2$, 0.1-5% $RE_2O_3$, 225-25% $Fe_2O_3$, 35-75% $Al_2O_3$, and 10-40% $TiO_2$, wherein the rare earth metal is selected from the group consisting of La, Ce, Pr, Nd, Sm, Eu, Gd, Tb, Dy, Er, Yb, Y, Sc, and mixtures thereof. The preferred compositions consist essentially, expressed in terms of weight percent on the oxide basis, of about 5-20% $SiO_2$, 0.1-5% $RE_2O_3$, 225-25% $Fe_2O_3$, 40-65% $Al_2O_3$, and 10-35% $TiO_2$, and the most preferred compositions consist essentially of 10–20% $SiO_2$, 0.1–5% $RE_2O_3$, 8–25% $Fe_2O_3$, 45–60% $Al_2O_3$, and 15–30% $TiO_2$. Amounts of $Fe_2O_3$ in excess of 5% (e.g. at least 8%) are demanded to impart the desired resistance to thermal decomposition of the aluminum titanate crystals; i.e., to insure the stabilization of the aluminum titanate crystals. Above 25% $Fe_2O_3$, however, thermal deformation and actual melting of the products have been observed at temperatures in the vicinity of 1400° C.

Iron-aluminum oxide or titanate solid solutions within the invention can consist essentially of, by weight percent, 30 to 75 percent alumina, 20 to 65 percent titania, and optionally, greater than 5% to 25% iron oxide exhibit excellent thermal stability. This thermal stability was indicated by x-ray diffraction patterns. The patterns revealed that the solid solution decomposition products of $Al_2O_3$, $Fe_2O_3$, and $TiO_2$ were less than 20 percent of the total stoichiometric decomposition. The bodies had been heat treated within the temperature range of approximately 1000° C. to 1300° C. A preferred solid solution consists essentially of, 35 to 50 percent alumina, 40 to 42 percent titania, and 8 to 25 percent iron oxide. The most preferred solid solution consists essentially of 35 to 50 percent alumina, 40 to 42 percent titania, and 15 to 25 percent iron oxide.

Any of the practices conventionally employed in the ceramic art for forming finely-divided powders into shapes of a desired configuration are applicable with the inventive compositions. Such methods include dry pressing, hot pressing, slip casting, isostatic pressing, hot isostatic pressing, and extrusion. For example, where the inventive materials are to be used as filters for fluids or as substrates for catalytic converters, they can be readily extruded into honeycomb structures.

In general, sintering temperatures over the interval of about 1400°–1650° C. will be utilized. Nevertheless, it will be recognized that through the use of expedients known to the ceramic art, such as the use of substantial amounts of sintering aids, the use of calcined or prereacted clinker as a portion of the batch, and the careful choice of batch materials, the firing temperatures required can be reduced. It will be appreciated, however, that the applications to which the fired bodies are to be exposed for extended periods will involve temperatures below that at which the bodies were sintered. Hence, the shrinkage undergone by a body during sintering is a function of the firing temperature employed. Accordingly, where a body is subsequently exposed to a temperature above that at which it was sintered, further shrinkage will occur which may render the body unusable for a particular application. Typically, the shrinkage experienced by the inventive bodies sintered over the temperature interval of 1400°–1650° C. will range about 2–15%, the level of shrinkage increasing as the temperature is raised.

Where the inventive products are to be used in fluid filter applications or as substrates for catalytic converters, porosity of the body and the size of the pores are important. As can be appreciated, the total porosity and the size of the pores are directly influenced by the temperature at which the body is sintered; hence, the higher the temperature, the lower total porosity and the smaller the average pore size. To illustrate, open poosity in the inventive products will average about 30–50% when a sintering temperature of 1400° C. is employed; whereas at a firing temperature of 1650° C., the average is decreased to about 5–15%. The average pore size varies between about 1–15 microns, the size being generally smaller at the higher sintering temperatures.

Microscopic examination of the sintered inventive products has revealed the presence of extensive very fine intracrystalline and grain boundary cracking similar to that described in the U.S. Pat. No. 4,483,944 patent. As was explained there, these forms of microcracking permit the bodies to yield under thermal stress, thereby conferring upon the bodies excellent resistance to thermal shock. It appears that more of such microcracking occurs as the sintering temperature is raised.

X-ray diffraction analyses have indicated the microstructure of the inventive products to consist essentially of aluminum titanate solid solution and mullite with a very minor amount of rare earth metal oxide. Microscopic examinations have shown that the rare earth metal oxides are generally located along the grain boundaries of the mullite crystals and aluminum titanate solid solution crystals. It has been postulated that the rare earth metal oxides act as grain growth inhibitors with respect to the solid solution crystals. Such action is especially beneficial when the inventive bodies are fired at high temperatures and/or are subsequently exposed to high temperatures. In general, the aluminum titanate solid solution crystals tend to grow in size as the temperature is increased. Through x-ray diffraction analyses and electron micrographs it has been estimated that, by volume, the content of aluminum titanate solid solution crystals ranges about 25–90% and the content of mullite crystals varies about 5–70% with the rare earth metal oxide comprising up to the remainder. A preferred composition of this solid solution is 50 to 75 percent iron-aluminum titanate solid solution, 20 to 50 percent mullite, and 0.1 to 5 percent rare earth oxide.

We have found that this invention provides an aluminum titanate based body wherein the linear coefficient of thermal expansion (25°–800° C.) ranges between $-25 \times 10^{-7}$ per °C. and $25 \times 10^{-7}$ per °C. and measurements of modulus of rupture (MOR) by the four point bend method, range from 1000 psi to 9000 psi.

And finally, our invention provides an aluminum titanate based ceramic body with a coefficient of thermal cycling growth approaching approximately $200 \times 10^{-4}$ % per cycle, with the most preferred embodiment exhibiting a coefficient of thermal cycling growth approaching $25 \times 10^{-4}$.

DETAILED DESCRIPTION

Figure 1:
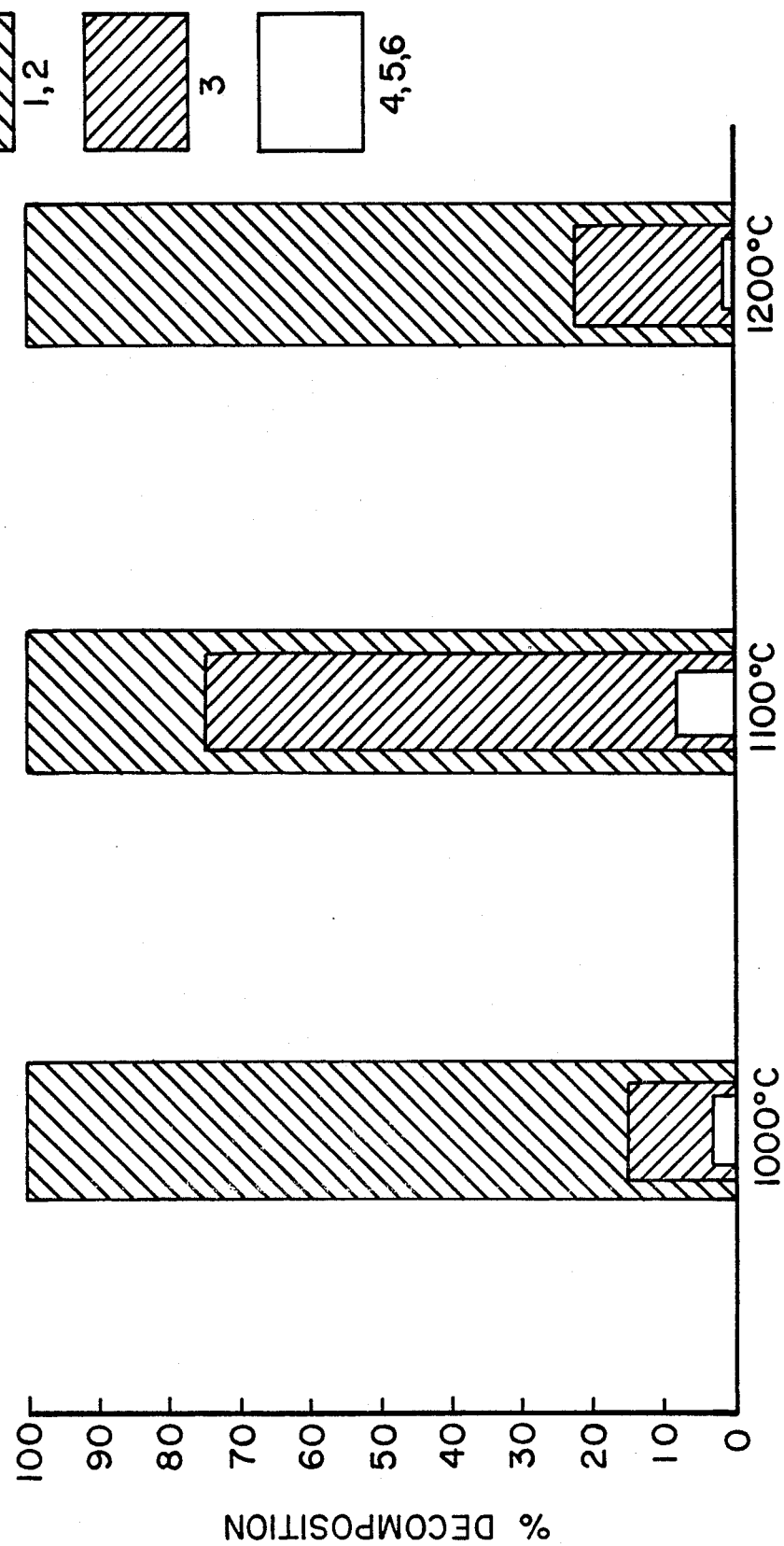
Figure 2:
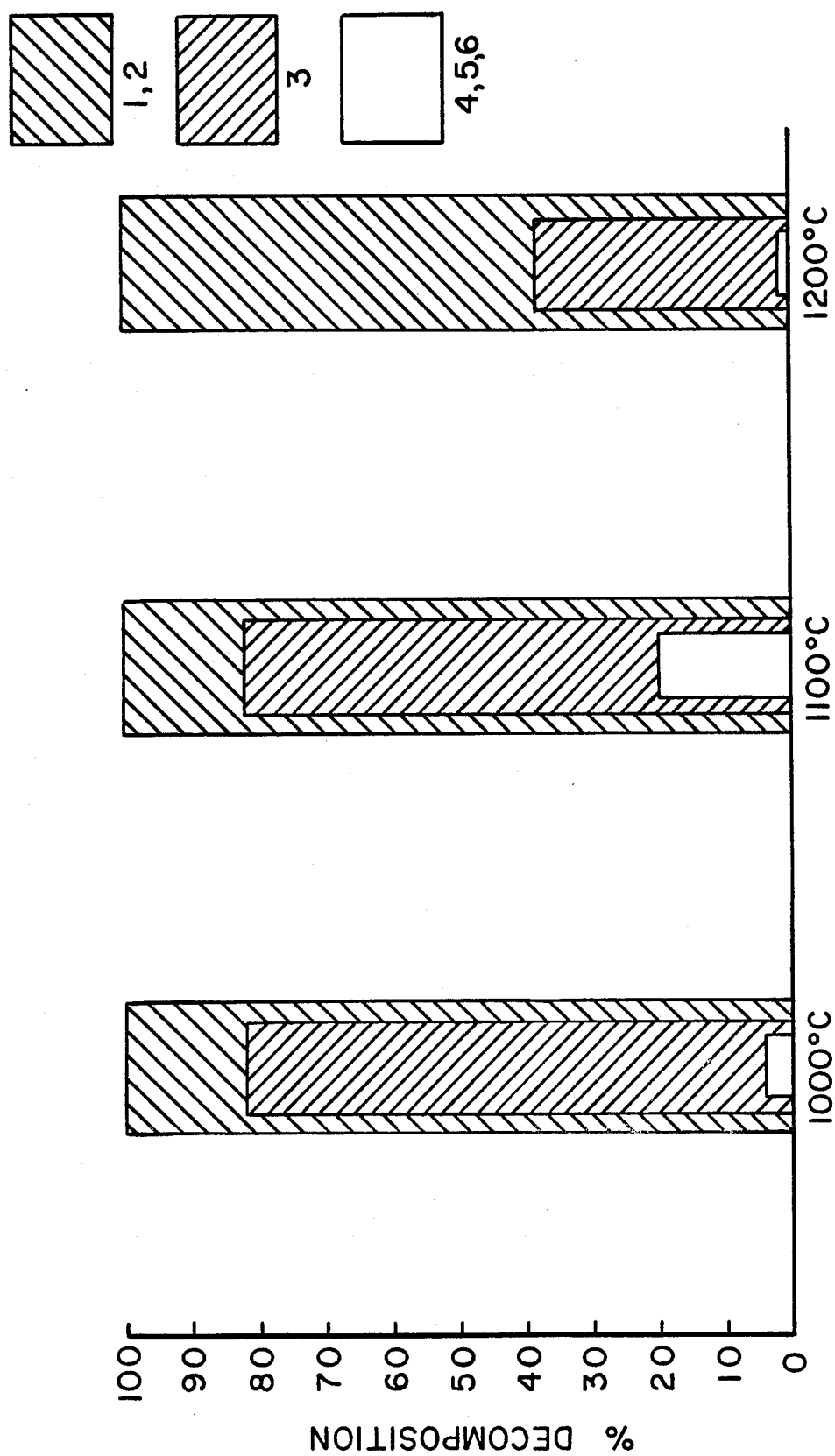

FIGS. 1 and 2 show x-ray diffraction results of isothermal heat treatment data which include prior art compositions and the titanate solid solution for the present inventive compositions, treated for 512 and 1024 hours, respectively.

The prior art, Examples 1, 2, and 3, exhibit the heretofore known decomposition results characteristic of aluminum titanate bodies exposed to the 1000° C. to 1300° C. temperature range. It is noteworthy that each composition tested exhibited a maximum decomposition at approximately 1100° C. when tested for 512 hours. The decomposition effect broadens as the testing time is lengthened to 1024 hours, extending the maximum decomposition of the aluminum titanate body to a higher and lower temperature range. The percent of decomposition is determined by x-ray diffraction. When a sample thermally decomposes, the x-ray diffraction pattern exhibits prominent $Al_2O_3$ and $TiO_2$ peaks. The area under the peaks is proportional to the amount of aluminum titanate that has decomposed into its constituent molecular forms, titania and alumina.

The titanate solid solution compositions of the present invention, those embodied by Examples 4, 5, 6, and 7, as in FIGS. 1 and 2, exhibit remarkable durability to thermal decomposition, when compared to the same temperatures as those experienced by Examples 1, 2, and 3. There was no greater than 20 percent decomposition exhibited by the titanate solid solution of the inventive compositions.

Table 1 shows the compositions of the iron-aluminum titanate solid solution phase of these Examples. There is a marked difference in thermal durability between Examples 3 and 4 where the primary difference in the compositions is the increase in iron oxide concentration.

TABLE 1

| | Concentrations in Weight Percent | | |
|---|---|---|---|
| Example | $Al_2O_3$ | $TiO_2$ | $Fe_2O_3$ |
| 1 | 56.10 | 43.90 | 0.00 |
| 2 | 55.33 | 43.79 | 0.88 |
| 3 | 52.43 | 43.25 | 4.32 |
| 4 | 48.91 | 42.58 | 8.51 |
| 5 | 45.49 | 41.94 | 12.57 |
| 6 | 42.17 | 41.31 | 16.52 |
| 7 | 35.83 | 40.05 | 24.05 |

The compositions in Table 1 were batched, fired, and tested for thermal durability at 512 and 1024 hours. Thermal shock resistance is proportional to the thermal expansion coefficient. Therefore, it can be inferred from FIGS. 1 and 2, that thermal shock resistance for heat treated samples within the temperature region of approximately 1000° C. to 1300° C. is greatly enhanced for the compositions in Examples 4 through 7. The enhancement is evidenced by the lack of significant increase in thermal expansion. It has been found that too much iron oxide, greater than 25 weight percent, causes the body to slump on firing, and in some cases the body melted.

Once the thermal properties of the solid solution of iron and aluminum titanate bodies were determined, the bodies were mixed with mullite and rare earth oxides to determine if a composite body of this composition would exhibit desirable mechanical properties. Samples batched, as in Examples 4 through 7 in Table 1, were mixed with rare earth oxides and mullite. Advantageously, the rare earth oxides, such as the nitrate salt mixture of lanthanum and neodymium in concentrations ranging from 0.1 to 5 weight percent, were mixed with the titanates before mixing with mullite and fired in the body as a sintering aid and grain growth inhibitor. The addition of the rare earths and mullite did not negatively affect the desired thermal stability or expansion properties of the high iron titanate body.

The resultant ceramic body exhibits high thermal shock resistance, low thermal expansion, and high mechanical strength. The linear coefficienit of thermal expansion (25°-800° C.) of the composition corresponding to Example 9 is approximately $21.1 \times 10^{-7}$ and that of the corresponding Example 12 is approximately $-8 \times 10^{-7}$ per ° C. This thermal expansion range indicates that the material has a low thermal expansion over the temperature range of interest. The four point bend MOR's for the same mullite, rare earth additions to Examples 4 and 7 ranged from 1000 psi to 9000 psi, respectively.

Shown in Table 2 are the results of the four point bend Modulus of Rupture (MOR) tests performed on 5/16 inch round cross sectional rods of the high iron-aluminum titanate solid solution, mullite, and rare earth ceramic bodies. The compositions, in weight percent, track very closely to those of Examples 3–7 in Table 1.

TABLE 2

| Example | $SiO_2$ | $Al_2O_3$ | $TiO_2$ | $Fe_2O_3$ | $RE_2O_3$ | MOR | CTE $\times 10^{-7}$/°C. (25°-800° C.) |
|---|---|---|---|---|---|---|---|
| 8 | 8.46 | 54.78 | 28.94 | 5.78 | 2.04 | 3010 | −.7 |
| 9 | 8.46 | 45.89 | 27.27 | 16.34 | 2.04 | 4850 | 21.1 |
| 10 | 14.10 | 53.30 | 19.48 | 11.67 | 1.45 | 5820 | — |
| 11 | 14.10 | 56.37 | 20.05 | 8.02 | 1.46 | 3350 | 8.1 |
| 12 | 8.46 | 50.20 | 28.07 | 11.23 | 2.04 | 4250 | −8.0 |

The levels of the representative mullite phase in the above Examples 8–12 were, respectively, 30, 30, 50, 50, and 30 percent. These same Examples exhibited little or no decomposition when analyzed by x-ray diffraction, after being heat treated, similar to those Examples in FIGS. 1 and 2. All Examples in Table 2 exhibited significant improvements over the prior art samples exhibited in FIGS. 1 and 2. Although the coefficient of thermal expansion increased in Examples 8, 9, and 11 over the Examples of FIGS. 1 and 2, the thermal expansion exhibited is well within the limits desirable for good thermal expansion properties.

Table 3 shows the results of MOR tests performed on samples lacking mullite and rare earth oxides. The compositions are given in weight percent and the MOR values in psi.

TABLE 3

| Example | $Al_2O_3$ | $TiO_2$ | $Fe_2O_3$ | MOR |
|---|---|---|---|---|
| 13 | 52.43 | 43.25 | 4.32 | 164 |
| 14 | 48.91 | 42.58 | 8.51 | 142 |
| 15 | 42.17 | 41.31 | 16.52 | 183 |
| 16 | 35.83 | 40.12 | 24.05 | 269 |

The addition of the mullite and rare earth oxides produces more than an order of magnitude difference in the mechanical strength as measured by the four point bend test. Comparisons between the two tables are inexact since the normalized values of the compositions change as the constituent oxides change. The range, however, of the iron titanate phase is sufficiently broad to indicate that within this range, the values of mechanical strength vary by not more than 70 to 80 percent. This indicates that changes in the composition, therein, do not critically change the mechanical strength of the body. Higher processing temperatures, such as those greater than 1500° C., will lead to CTEs bounded by $-20 \times 10^{-7}$/° C.

When the MOR measurements in Table 3 are compared to those exhibited by the mullite, rare earth, iron aluminum titanate Examples in Table 2, it is easily concluded that for the same approximate solid solution phase, titanate compositional range, Table 2 Examples show the desired and critical increase in measured strength (more than 2000% over that in Table 3). Therefore, the addition of mullite and rare earth oxides to the high iron titanate body significantly increases mechanical strength, as inferred from the MOR measurements. This increase in strength, as will be shown below, does not significantly compromise the thermal properties of the high iron titanate body.

The body of the inventive composition consists essentially of $Al_2TiO_5$, $Fe_2TiO_5$, rare earths, and mullite. Those skilled in the art will appreciate that there are several methods available to intermix these components to effect the advantages afforded by this composition. Table 4 shows the as-analyzed composition of a preferred embodiment of the invention.

TABLE 4

| Component | Weight Percent |
| --- | --- |
| $Al_2O_3$ | 56.13 |
| $SiO_2$ | 13.90 |
| $TiO_2$ | 20.35 |
| $Fe_2O_3$ | 8.14 |
| $Re_2O_3$ | 1.50 |

A preferred method to prepare the composition in Table 4 is essentially a two-step process. The first step was to mix 37 weight percent of $Al_2O_3$ with the $Fe_2O_3$ (a pigment grade hematite), and the $TiO_2$. The particle size distribution of these components was preferably $-100$ mesh (less than $149\mu$ diameter). The powdered components were placed in a Littleford mixer and blended for a period of 5 minutes. This material was transferred to a Simpson mixmuller and combined with water and an organic binder, such as methylcellulose, to form agglomerates of the mixture. The water addition contained a solution of 3 weight percent rare earth nitrate. The rare earth nitrate was a solution of La/Nd in a 75/25 by weight proportion, respectively. The rare earth component may be optionally added to either step in the process without significant loss of properties in the resultant body. The agglomerated material was air-dried for 24 hours, transferred to alumina vessels, placed in a periodic kiln, and fired at 1400° C. for 6 hours. The resultant composition consisted essentially of a single phase solid solution of $Fe_2TiO_5$ and $Al_2TiO_5$. The rare earth oxides reside principally at the grain boundaries to control grain growth behavior.

The calcined agglomerates were ground to $-100$ mesh with a preferred median particle size of approximately $40\mu$. Initially, the agglomerates were ground in a jaw crusher and subsequently ground by ball milling with $\alpha$-alumina grinding media. After ball milling, the powder was sieved and the particle size measured.

In the second step, the calcined powder was transferred to a Littleford mixer and mixed with the remaining components to form the preferred composition in Table 4. The additional components of 14.10 weight percent $SiO_2$ and 12.14 weight percent $Al_2O_3$ were added in the form of kaolinite clay. The remaining 7.00 weight percent alumina was added in the form of $\alpha$-alumina in this step to provide the total composition of 56.13 weight percent alumina. The total mix was blended in a Littleford mixer for 5 minutes.

The powdered mixture was transferred to a Simpson mix-muller, plasticized, and extruded according to standard extrusion practices known in the art. Water was removed from the cellular ware using dielectric dryers, and the honeycomb pieces were subsequently fired between approximately 1400° C. and 1650° C.

To compare the properties of the inventive composition with a prior art composition, samples were prepared according to the composition in Table 5 and the above preferred method.

TABLE 5

| Component | Weight Percent |
| --- | --- |
| $Al_2O_3$ | 59.29 |
| $SiO_2$ | 13.68 |
| $TiO_2$ | 21.28 |
| $Fe_2O_3$ | 4.25 |
| $Re_2O_3$ | 1.50 |

Examples from Table 4, the inventive composition, and Table 5, a low iron prior art composition, were subjected to isothermal heat treatment at 1000° C., 1100° C., and 1200° C., for 1024, 537, and 1024 hours, respectively. The treated Examples were analyzed by x-ray diffraction to determine the extent of decomposition from the solid solution to $Al_2O_3$ and $TiO_2$. The composition of Table 5 exhibited pronounced peaks at the $TiO_2$ and $Al_2O_3$ peak sites hence, evidencing the substantial decomposition observed in Examples 1, 2, and 3 in FIGS. 1 and 2. The Example from Table 4 exhibited smaller peak heights, thereby indicating significantly less decomposition. The latter peak heights were quite analogous to the percent decomposition exhibited by Example 4 in FIGS. 1 and 2.

These tests indicate that the addition of mullite and rare earths, individually or collectively, to the $Fe_2TiO_5$ and $Al_2TiO_5$ single phase solid solution does not interfere with the advantageous properties exhibited by the solid solution examples of the invention in FIGS. 1 and 2. The resultant mullite and rare earth enriched body is fortified with the thermal shock resistant property attributed to the iron rich aluminum titanate phase, and continues to benefit from the mechanical strength properties added by the mullite and rare earths. The body of the inventive composition is capable of withstanding the critical temperature range without the loss of thermal expansion and/or mechanical strength properties.

We claim:

1. A sintered ceramic article containing iron-aluminum titanate solid solution and mullite as the predominant crystal phases with a minor amount of a rare earth metal oxide crystal phases, said article exhibiting grain boundary and intracrystalline microcracking and consisting essentially, expressed in terms of weight percent on the oxide basis, of 1.5-20% $SiO_2$, >5-25% $Fe_2O_3$, 35-75% $Al_2O_3$, 10-40% $TiO_2$, and 0.1-5% $RE_2O_3$.

2. A sintered ceramic article according to claim 1 wherein said crystal phases, expressed in terms of volume percent, consist essentially of about 25-90% iron-aluminum titanate solid solution and about 5-70% mullite with the rare earth metal oxide comprising up to the remainder.

3. A sintered ceramic body as in claim 2 wherein said solid solution consists essentially of, by weight percent, 30 to 75 percent alumina, 20 to 65 percent titania, and >5 to 25 percent iron oxide.

4. A sintered ceramic body as in claim 3 wherein said solid solution is stable to within less than 20 percent of a total stoichiometric decomposition, wherein said decomposition products are $Al_2O_3$, $Fe_2O_3$, and $TiO_2$, within the temperature range between approximately 1000° C. to 1300° C.

5. A sintered ceramic body as in claim 1 wherein said rare earth oxide is selected from the group consisting essentially of lanthanum, cerium, praseodymium, neodymium, samarium, europium, gadolinium, terbium, dysprosium, erbium, ytterbium, yttrium, scandium, and/or a combination thereof.

6. A sintered ceramic body as in claim 1 wherein said body exhibits a coefficient of thermal expansion between $-25 \times 10^{-7}/°C.$ and $25 \times 10^{-7}/°C.$ (25°–800° C.).

7. A sintered ceramic body as in claim 1 wherein said body exhibits a four point bend MOR in the range from 1000 psi to 9000 psi.

8. A sintered ceramic body as in claim 1 wherein said body exhibits a coefficient of thermal cycling growth of less than $200 \times 10^{-4}$ percent per cycle.

9. A sintered ceramic body as in claim 1 wherein said body is a honeycomb.

10. A sintered ceramic body consisting essentially of, by weight percent, 50 to 75 percent iron-aluminum titanate solid solution, 20 to 50 percent mullite, and 0.1 to 5 percent rate earth oxide.

11. A sintered ceramic body as in claim 10 wherein the solid solution consists essentially of, by weight percent, 35 to 50 percent alumina, 40 to 42 percent titania, and 8 to 25 percent iron oxide.

12. A sintered ceramic body as in claim 10 wherein the solid solution consists essentialy of, by weight percent, 35 to 50 percent alumina, 40 to 42 percent titania, and 15 to 25 percent iron oxide.

* * * * *

UNITED STATES PATENT AND TRADEMARK OFFICE
CERTIFICATE OF CORRECTION

PATENT NO. : 4,855,265
DATED : August 8, 1989
INVENTOR(S) : John P. Day and Robert J. Locker It is certified that error appears in the above-identified patent and that said Letters Patent is hereby corrected as shown below:

Col. 1, Line 25, "mechanical properties" should read -- mechanical shock properties --.

Col. 2, Line 61, "225-25%" should read -- >5-25% --.

Col. 2, Line 68, "225-25%" should read -- >5-25% --.

Col. 3, Line 65, "poosity" should read -- porosity --.

Claim 10, Line 1, "A sintered ceramic body consisting" should read -- A sintered ceramic body as in claim 1 consisting --.

Signed and Sealed this

First Day of January, 1991

Attest:

HARRY F. MANBECK, JR.

Attesting Officer

Commissioner of Patents and Trademarks